(12) United States Patent
Zhu et al.

(10) Patent No.: US 7,544,295 B2
(45) Date of Patent: Jun. 9, 2009

(54) OIL FILTER HOUSING

(75) Inventors: Mingzhen Zhu, Beijing (CN); Shiliang Chen, Beijing (CN)

(73) Assignee: Beijing SZYN Technology Co., Ltd., Beijing (CN)

( * ) Notice: Subject to any disclaimer, the term of this patent is extended or adjusted under 35 U.S.C. 154(b) by 0 days.

(21) Appl. No.: 12/133,875

(22) Filed: Jun. 5, 2008

(65) Prior Publication Data
US 2009/0039007 A1   Feb. 12, 2009

(30) Foreign Application Priority Data
Jun. 8, 2007   (CN) .................. 2007 1 0110802

(51) Int. Cl.
*B01D 27/08* (2006.01)
*B01D 35/30* (2006.01)
(52) U.S. Cl. ............... 210/232; 210/444; 210/450
(58) Field of Classification Search ......... 210/232, 210/443, 444, 450
See application file for complete search history.

(56) References Cited

U.S. PATENT DOCUMENTS 4,622,136 A * 11/1986 Karcey .......... 210/167.09
4,832,836 A * 5/1989 Selsdon ........... 210/133
4,992,166 A * 2/1991 Lowsky et al. ...... 210/130
5,681,461 A * 10/1997 Gullett et al. ....... 210/232
5,922,196 A * 7/1999 Baumann .......... 210/232
7,090,773 B2 * 8/2006 Meddock et al. ..... 210/342

FOREIGN PATENT DOCUMENTS

CN   2725538   9/2005

* cited by examiner

Primary Examiner—Thomas M Lithgow
(74) Attorney, Agent, or Firm—Morgan, Lewis & Bockius, LLP

(57) ABSTRACT

The present invention discloses an oil filter housing, comprising an upper bowl adapted to be mounted onto a filter-mounting base of an engine, a top end of the upper bowl being formed with oil inlets and an oil outlet, and a protruding structure being provided on an outer top end surface of the upper bowl, the protruding structure adapted to be engaged with the filter-mounting base so as to position the upper bowl and limit rotation of the upper bowl relative to the filter-mounting base; and a lower bowl detachably coupled to the upper bowl and a bottom end of the lower bowl being closed. The oil filter housing according to an embodiment of the present invention is simple in structure, low in cost, easy to operation and safe.

9 Claims, 4 Drawing Sheets

OIL FILTER HOUSING

BACKGROUND OF THE PRESENT INVENTION

1. Field of the Present Invention

Embodiments of the present invention relate to an oil filter housing, more particularly to a separate oil filter housing.

2. Description of the Related Art

An oil filter is used to filter a medium, such as oil, lubricating an engine system. Impurities such as metal scraps, carbon particles produced and mixed into the oil during combustion and gum gradually produced by the oil are filtered by a filter element of the oil filter. Therefore, the oil filter has to be termly replaced frequently, otherwise the engine may suffer from abnormal abrasion which may result in power dropping of the engine, increasing of the oil consumption, and reduced operation life, even fuel leakage and detonation causing severe damage to or discard of the engine.

Conventional oil filter housing of the oil filter has an integral steel-made body which is not detachable. In addition, the filter element can not be taken out from the housing. The housing and the filter element are discarded together after usage, thus resulting in waste.

Chinese Utility Model CN2725538 discloses an oil filter with an exchageable filter element, in which the housing has a separate configuration. However, a lower cover of the housing is coupled to the engine body by a nut. In use, the housing may rotate relative to the engine body, which may resulting in oil leakage. In addition, when the upper cover of the housing is unscrewed to replace the filter element, the lower cover will rotate together with the upper cover. Thus, the replacement of the filter element can not be finished and operability thereof is poor.

SUMMARY OF THE PRESENT INVENTION

The embodiments of the present invention overcome at least one of the problems in the related art in the oil filter housing.

Accordingly, an embodiment of the present invention provides a separate oil filter housing which can be repeatedly used, detached conveniently, and easy to operate. Meanwhile, the sealing performance between the oil filter housing and a filter-mounting base is good.

An embodiment of the present invention provides an oil filter housing, comprising: an upper bowl adapted to be mounted onto a filter-mounting base of an engine, in which a top end of the upper bowl is formed with oil inlets and an oil outlet, and a protruding structure is provided on an outer top end surface of the upper bowl and adapted to engage with the filter-mounting base so as to position the upper bowl and restrict rotation of the upper bowl relative to the filter-mounting base; and a lower bowl detachably coupled to the upper bowl, in which a bottom end of the lower bowl is closed.

According to further aspects of the embodiment of the present invention, the oil filter housing further has the following additional features:

The upper bowl and the lower bowl are threadedly coupled to each other.

The protruding structure is integrally formed with the upper bowl.

The protruding structure is formed in the form of a ring-shaped protrusion with axial recessed notches formed on a wall thereof.

The upper bowl and the lower bowl are formed of non-metal material.

The upper bowl and the lower bowl are formed of modified nylon.

a plurality of the oil inlets are circumferentially formed in the top end surface of the upper bowl, the oil outlet is formed at the center of the top end surface of the upper bowl, and the protruding structure is located circumferentially between the oil outlet and the plurality of oil inlets.

The outer top end surface of the upper bowl is formed with a circumferential groove with a sealing pad received therein.

The top end surface of the upper bowl between the circumferential groove and the protruding structure is of an inwardly recessed arc-shaped surface.

Elastic locking hooks adapted to engage with a filter element are formed on an inner bottom surface of the lower bowl.

The oil filter housing according to the embodiments of the present invention produces at least one of the following advantages:

According to an embodiment of the present invention, the upper and lower bowls of the oil filter housing are detachably coupled to each other. Therefore, the oil filter housing can be opened so that the oil filter element can be replaced and the oil filter housing can be repeatedly used. When the oil filter housing is mounted onto the filter-mounting base, the protruding structure on the outer top end surface of the upper bowl is engaged with the filter-mounting base so as to position the upper bowl and prevent the upper bowl from rotating relative to the filter-mounting base, which ensures the sealing performance between the oil filter housing and the filter-mounting base, thus avoiding loosening and oil leakage between the filter-mounting base and the oil filter housing, and preventing brake contracting, firing from happening.

According to an embodiment of the present invention, when the oil filter is needed to replace, for example, only the lower bowl is detached from the upper bowl for replacing the filter element without detaching the upper bowl. The upper bowl can not be rotated due to the engagement of the protruding structure with the filter-mounting base. Therefore, the upper bowl will not be detached from the filer-mounting base together with the lower bowl and still retained on the filter-mounting base. Therefore, the detaching, mounting and operation of the oil filter are easy with comparison to the conventional.

According to an embodiment of the present invention, the upper bowl and the lower bowl are threadedly coupled to each other. Thereby, when the oil filter needs to be replaced, only the lower bowl is detached by rotation relative to the upper bowl for replacing the filter element, after replacement of the filter element, the lower bowl is screwed to the upper bowl. Therefore, the assembly and operation of the oil filter are convenient and simple.

According to an embodiment of the present invention, the protruding structure is formed as a ring-shaped protrusion, and axial recessed notches are formed on the sidewall thereof, so that the ring-shaped protrusion can be fitted over a boss of the filter-mounting base and the axial recessed notches 15 engage the reinforcing ribs around the boss, so that the upper bowl is positioned and the rotation thereof relative to the filter-mounting base is restrict. Therefore, the structure of the protruding structure is simple and very reliable.

According to an embodiment of the present invention, the upper bowl and the lower bowl are formed of non-metal material, such as modified nylon. The modified nylon is resistant to oil, high temperature, high pressure, which is simple to manufacture, thus saving metal material and reducing cost. With comparison to the metal housing, it has improved performance and reliabilities. In addition, the protruding structure can be molded integrally with the upper bowl, which further simplifies manufacturing process and reduces cost.

According to an embodiment of the present invention, a circumferential groove is formed in the outer top end surface of the upper bowl for receiving a sealing pad, which can further enhance the sealing performance between the oil filter housing and the filter-mounting base, thus preventing oil leakage. Since the upper bowl can not rotate with respect to the filter-mounting base, the sealing pad will not be worn, which lengthens the operation life and improves reliabilities of the sealing pad.

According to an embodiment of the present invention, the top end surface of the upper bowl between the circumferential groove and the protruding structure is of inwardly recessed arc-shaped. Therefore, the oil on the top end surface of the upper bowl tends to flow toward the center of the top end surface so that the oil flows into the oil filter through the oil inlets, thus reducing oil leakage possibilities between the filter-mounting base and the outer end surface of the upper bowl.

According to an embodiment of the present invention, elastic hooks adapted to engage a filter element are provided on an inner bottom surface of the lower bowl. Using the elastic hooks engaging the filter element, the mounting and assembling of the filter element is convenient, and the operation is simple.

Additional aspects and advantages of the embodiments of present invention will be given in part in the following descriptions, become apparent in part from the following descriptions, or be learned from the practice of the embodiments of present invention.

BRIEF DESCRIPTION OF THE DRAWINGS

Therese and other aspects and advantages of the present invention will become apparent and more readily appreciated from the following descriptions taken in conjunction with the drawings in which.

DETAILED DESCRIPTION OF EMBODIMENTS OF THE PRESENT INVENTION

Figure 1:
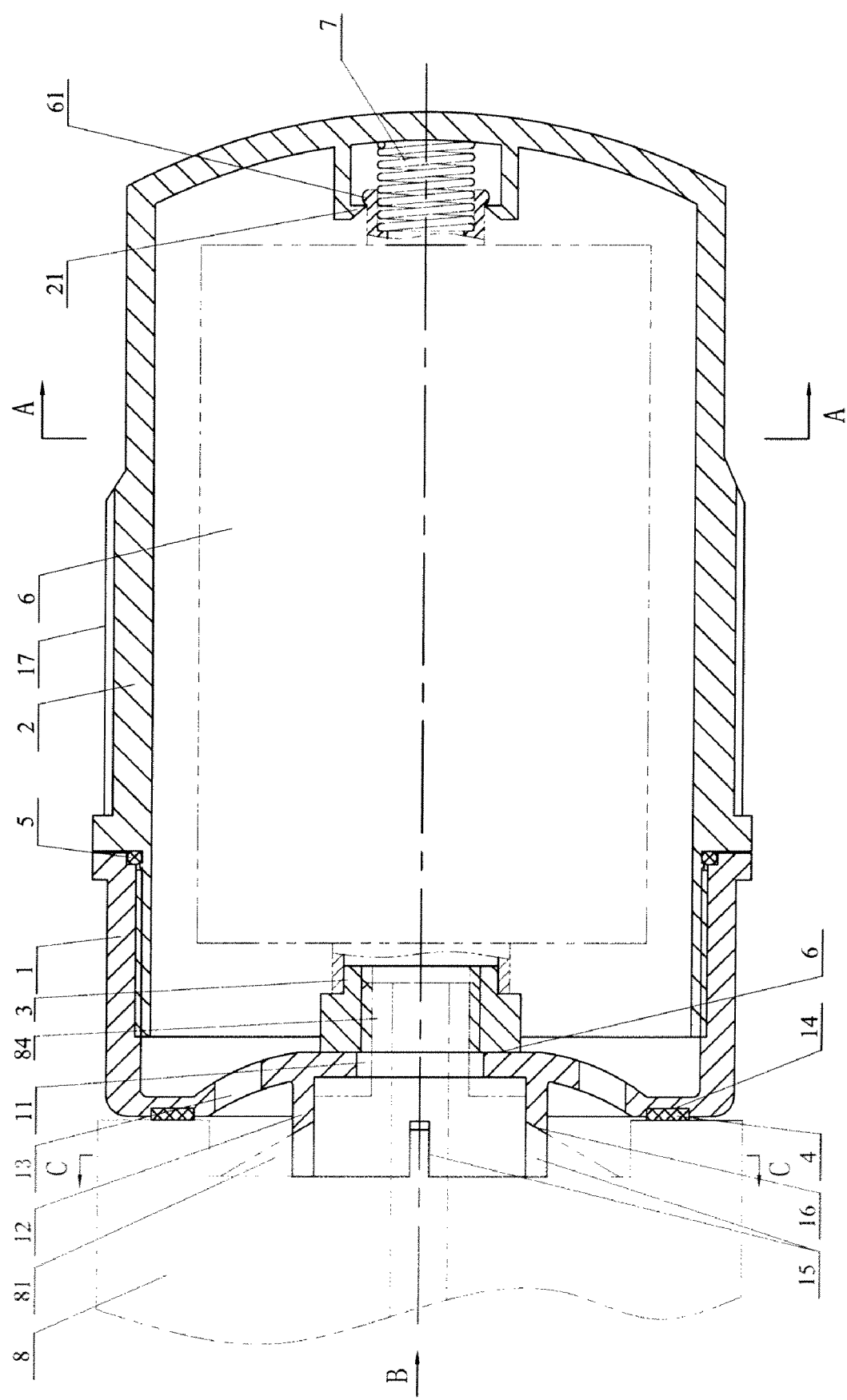
FIG. 1 is a cross-section view of a separate oil filter housing according to an embodiment of the present invention, in which a filter element of an oil filter and the filter-mounting base of the oil filter on an engine are indicated with dash line.

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

The oil filter housing according to an embodiment of the present invention will be described with reference to the drawings.

Figure 2:
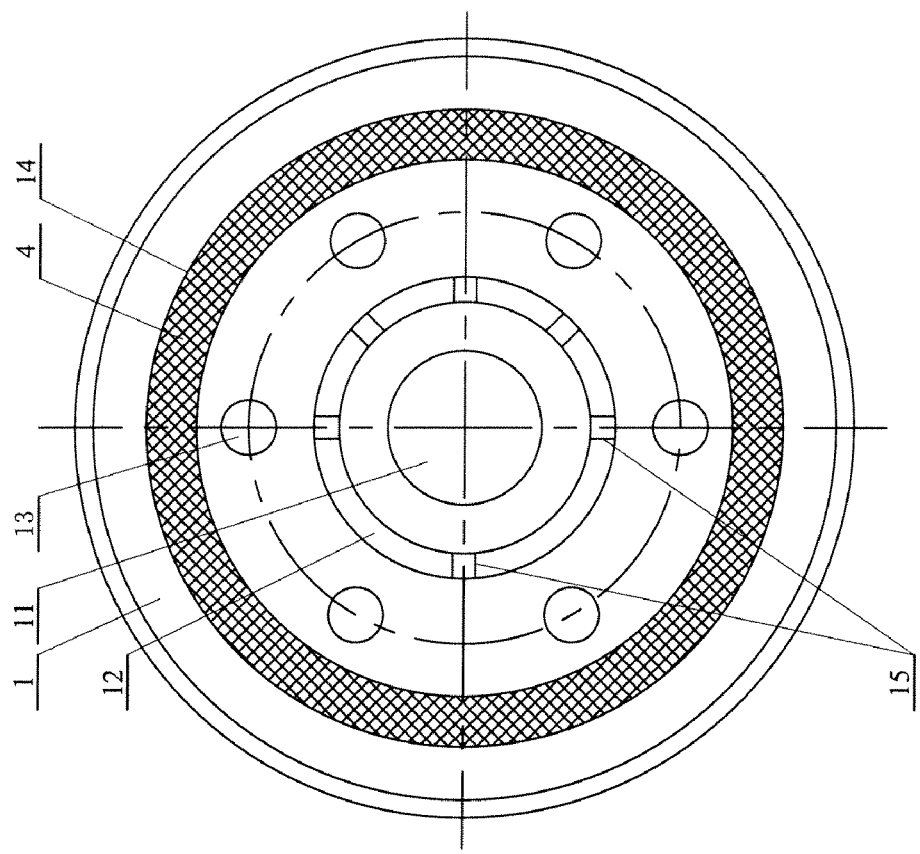
FIG. 2 is a view of the oil filter housing shown in FIG. 1 in B direction.

As shown in FIGS. 1 and 2, the oil filter housing according to an embodiment of the present invention comprises an upper bowl 1 and a lower bowl 2 which are detachably coupled to each other.

Figure 4:
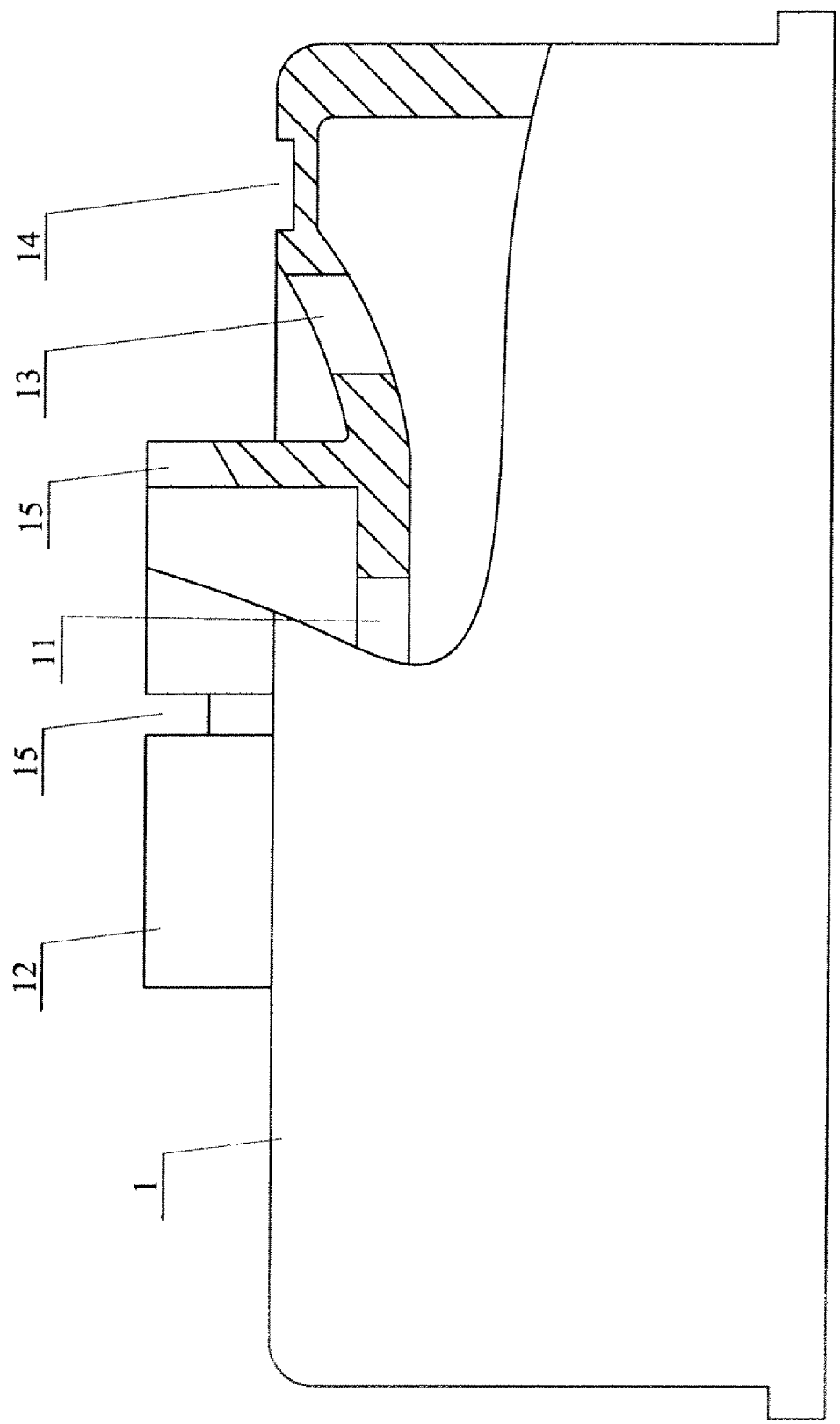
FIG. 4 is a schematic view of an upper bowl shown in FIG. 1.

As shown in FIGS. 1 and 4, a bottom end of the upper bowl 1 (right end in FIG. 1) is open and a top end (left end in FIG. 1) surface is formed with oil inlets 13 and an oil outlet 11, the oil supplied from an oil pump (not shown) can enter into the oil filter housing through the oil inlets 13, and flow into an interior of the engine through the oil outlet 11 while being filtered by an filter element disposed in the oil filter housing. An outer top end surface of the upper bowl 1 is formed with a protruding structure 12 for engaging a filter-mounting base 8 of the engine so as to position the upper bowl 1 and prevent the rotation of the upper bowl 1 with respect to the filter-mounting base 8.

A bottom end of the lower bowl 2 (right end in FIG. 1) is closed and a top end (left end in FIG. 1) is open. According to embodiments of the present invention, elastic locking hooks 21 for engaging the filter element is provided on an inner bottom end surface of the lower bowl 2. The elastic locking hooks 21 is integrally formed on the inner bottom end surface of the lower bowl 2, for example, the elastic locking hooks 21 can be integrally formed with the lower bowl 2 by molding injection.

Figure 3:
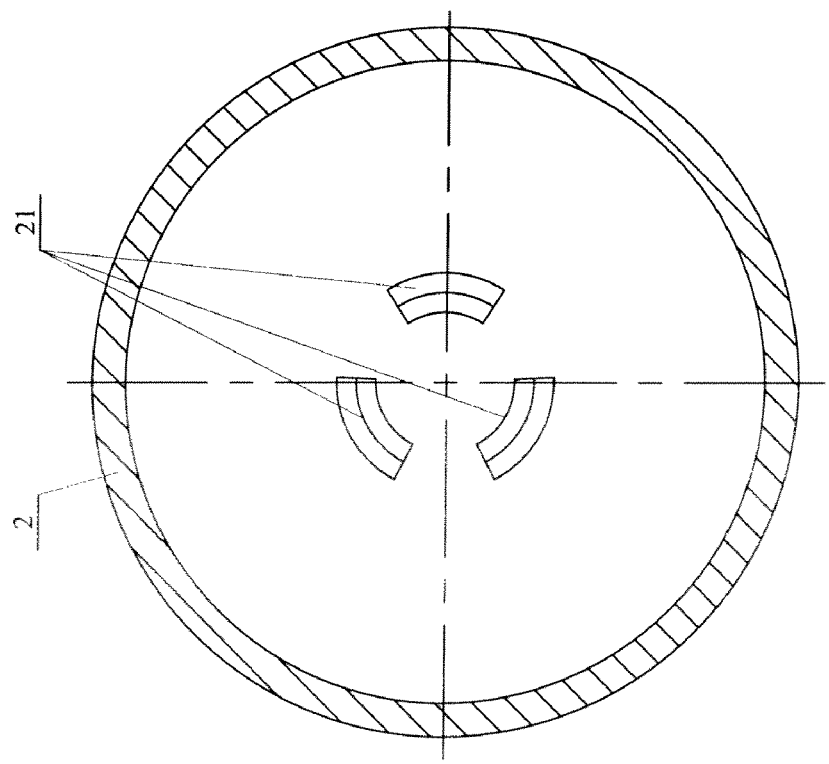
FIG. 3 is a cross section view of the oil filter housing shown in FIG. 1 along line A-A.

As shown in FIG. 3, there are three elastic locking hooks 21 which are distributed at intervals circumferentially. During assembling, a spring 7 between an connecting end of the filter element 6 and the lower bowl 2 is pre-compressed, a filter element-connecting flange 61 catches the elastic hooks 21 on the lower bowl 2 so that the detaching and assembling are convenient.

The bottom end of the upper bowl 1 and the top end of the lower bowl 2 are detachably coupled to each other, for example, the upper bowl 1 and the lower bowl 2 are screwed to each other. As shown in the embodiment shown in FIG. 1, the upper bowl 1 is formed with a female screw and the lower bowl 2 is formed with a male screw. Alternatively, the upper bowl 1 can be formed with a male screw and the lower bowl 2 is formed with a female screw. It should be noted that the coupling of the upper and lower bowls 1, 2 are not limited to screw connection. They can be detachably coupled by any means known to a person normally skilled in the art.

As shown in FIG. 1, a seal ring 5 is provided at the coupling of the upper bowl 1 with the lower bowl 2 for sealing a gap between the upper bowl 1 and the lower bowl 2. The upper bowl 1 is fitted over a boss 82 of the filter-mounting base 8 and fixed by a nut 3, with a sealing member 6 being provided at a contacting surface between the nut 3 and the upper bowl 1.

Figure 5:
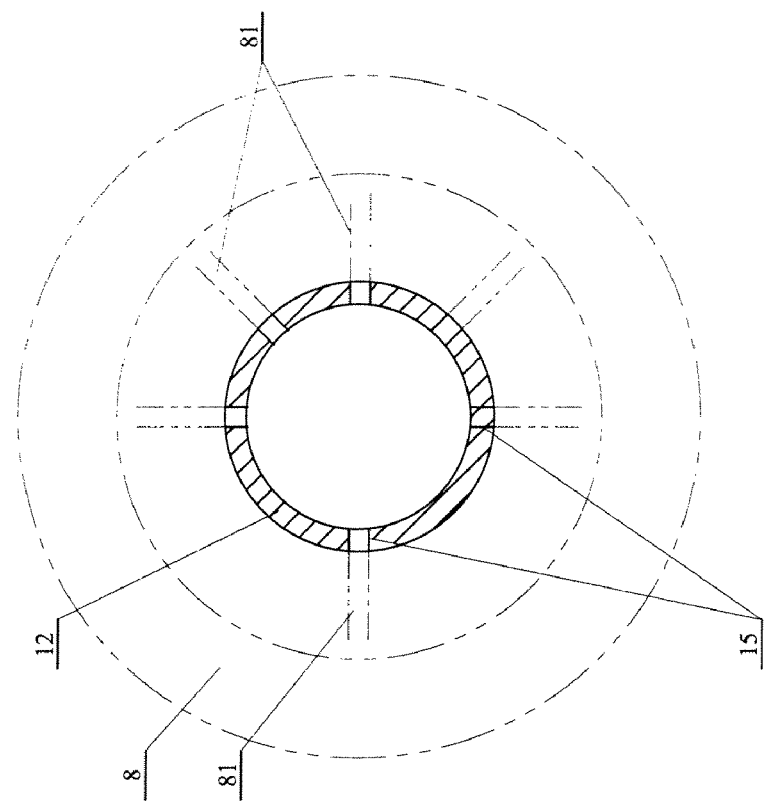
FIG. 5 is a cross section view of the oil filter housing shown in FIG. 1 along line C-C.

According to some embodiments of the present invention, as shown in FIGS. 1 and 5, a plurality of the oil inlets 13 are formed circumferentially in the top end surface of the upper bowl 1, the oil outlet 11 is formed at the center of the top end surface of the upper bowl 1, the protruding structure 12 is positioned circumferentially between the oil outlet 11 and the plurality of oil inlets 13.

Figure 6:
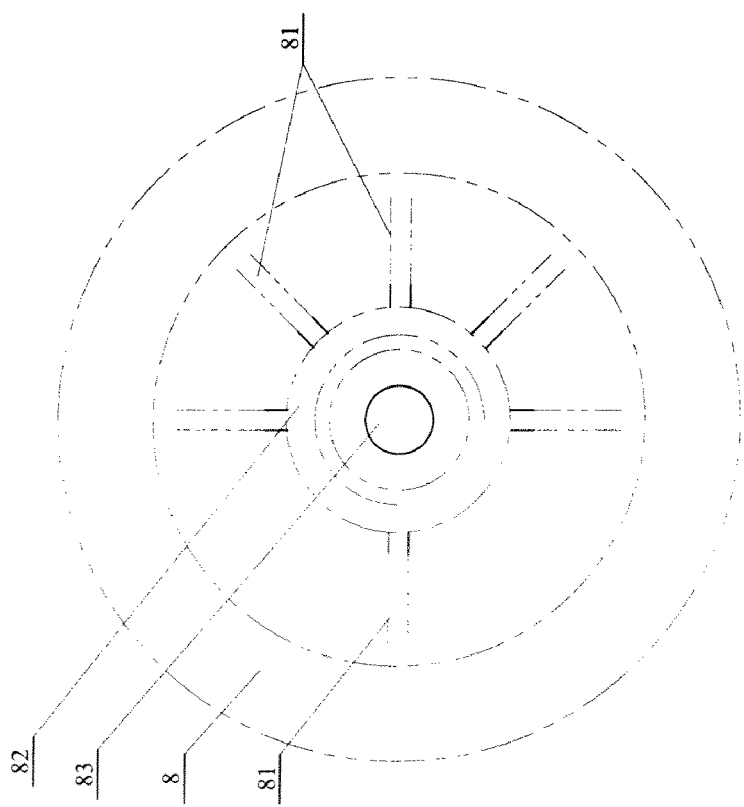
FIG. 6 is a plan schematic view of the filter-mounting base for mounting the oil filter housing according to an embodiment of the present invention.

According to some embodiments of the present invention, the protruding structure 12 is formed as a ring-shaped protrusion with axial recessed notches 15 formed in a sidewall of the ring-shaped protrusion, and a bottom surface 16 of the axial recessed notches 15 is an inclined surface. When the oil filter housing is mounted onto the filter-mounting base 8, the axial recessed notches 15 engage reinforcing ribs 81 on the filter-mounting base 8 (as shown in FIG. 6), so that the upper bowl 1 is positioned and the rotation of the upper bowl 1 with respect to the filter-mounting base 8 is prevented. The inclination of the bottom face 16 of the axial recessed notches 15 matches the inclination of the reinforcing ribs 81 on the filter-mounting base 8 for ensuring a reliable positioning.

Herein, as shown in FIG. 6, the boss 82 is formed at the center of the filter-mounting base 8, and an end of the boss 82 is integrally formed with a diameter reducing threaded part 84 for engaging the nut 3. A central hole 83 penetrates through the boss 82 and the threading part 84 so that oil can be send to the engine (not shown) through the central hole 83.

It can be understood that the protruding structure 12 can be formed into any shapes adapting to different filter-mounting bases 8 of different types of engine respectively. For example, the protruding structure 12 can be formed as cylindrical columns inserting into corresponding holes (not shown) formed in the filter-mounting base 8.

According to some embodiments of the present invention, the upper bowl 1 and the lower bowl 2 are made of non-metal material, such as plastic, glass or glass fiber reinforced plastic, more particularly modified nylon, the term modified nylon means a material which comprises a nylon as a base material and a modifier added to the nylon, so that the modified nylon can meet the requirements of oil, high temperature, high pressure resistances and high strength. For example, the modified nylon can be made from the nylon-66 added with a modifier. For a person normally skilled in the art, any known appropriate modifier can be used. It can be understood that the upper bowl 1 and the lower bowl 2 can be made from other non-metal material such as plastic as long as these non-metal materials can satisfies the performance requirements of the oil filter housing.

According to some embodiments of the present invention, the protruding structure 12 is integrally formed with the upper bowl 1, for example, the protruding structure 12 is integrally formed with the upper bowl 1 by molding injection.

According to some embodiments of the present invention, the outer top end surface of the upper bowl 1 is formed with a circumferential groove 14 positioned at an outside of the oil inlets 13, and a sealing pad 4 is received in the circumferential groove 14. The sealing pad 4 can be made of asbestos rubber material. The asbestos rubber material has characteristics of oil resistance and high temperature resistance, avoiding oil leakage due to aging of rubber based sealing members and improving the sealing performance between the upper bowl 1 and the filter-mounting base 8.

According to some embodiments of the present invention, the top end surface of the upper bowl 1 between the circumferential groove 14 and the protrusion 12 is an inwardly recessed arc-shaped surface. The locking force of the nut 3 can be transferred to the sealing pad 4 in the circumferential groove 14 by the arc-shaped surface, so that the upper bowl 1 can be sealed more tightly with the filter-mounting base 8, thus improving the sealing performance between the oil filter housing and the filter-mounting base 8. Meanwhile, the oil tends to flow toward the center of the upper bowl 1, thus avoiding oil flowing toward periphery portion and decreasing possibilities of oil leakage.

According to some embodiments of the present invention, the anti-skid embossing 17 can be formed on an external circumferential surface of the lower bowl 2 for conveniently rotating the lower bowl 2.

According to some embodiments of the present invention, the protruding structure 12 prevents loosening and oil leakage between the filter-mounting base 8 and the housing. According to some embodiments of the present invention, the oil filters are consumable with large market demand and consumption amount is large. By using the non-metal material such as plastics and nylon substituting for steel, the waste of steel can be avoided, and the cost can be decreased. In addition, the oil filter housing can be repeatedly used, which only needs to replace the filter element, thus further decreasing cost. In addition, when disassembled, the upper bowl 1 need not be detached from the filter-mounting base 8, and the upper bowl 1 is prevented from rotating with the lower bowl 2 by the protruding structure 12, so that the oil filter housing can be conveniently opened to replace the filter element, and the lower bowl 2 can be conveniently mounted onto the upper bowl 1.

The assembling and detaching of the oil filter using the oil filter housing according to an embodiment of the present invention will be briefly described below.

Firstly, the upper bowl 1 is mounted onto the filter-mounting base 8 of the engine with the axial recessed notches 15 on the protruding structure 12 catching and engaging the reinforcing ribs 81, and the upper bowl 1 is fixed to the filter-mounting base 8 by the nut 3. Then the spring 7 is disposed in the filter element connecting flange 61 at the connecting end of the filter element 6, and the spring 7 and the filter element 6 are put inside the lower bowl 2 together. The elastic locking hooks 21 catch the flange 61 at the connecting end of the filter element and pre-compress the spring 7. Then, the lower bowl 2 is screwed to the upper bowl 1.

When the oil filter is needed to be replaced, the lower bowl 2 is rotated to be detached from the upper bowl 1. Since the upper bowl 1 can not be rotated with the lower bowl 2 by means of the protrusion 12 engaging the reinforcing ribs 81, the upper bowl 1 still remains on the filter-mounting base 8. The filter element 6 is replaced, and the lower bowl 2 can be screwed to the upper bowl 1.

Therefore, the oil filter housing can be repeatedly used, and the upper bowl 1 needs not to be detached from the filter-mounting base 8, thus the mounting and/or detaching are simple and convenient. During the mounting and/or detaching of the lower bowl 2 and in use of the oil filter, the upper bowl 1 can not rotate with respect to the filter-mounting base 8, thus the abrasion of the sealing pad 14 is reduced, ensuring the sealing performance between the upper bowl 1 and the filter-mounting base 8, thus avoiding oil leakage.

Although explanatory embodiments have been shown and described, it would be appreciated by those skilled in the art that changes, alternatives, and modifications can be made in the embodiments without departing from spirit and principles of the present invention. Such changes, alternatives, and modifications all fall into the scope of the claims and their equivalents.

What is claimed is:

1. An oil filter housing, comprising:
   an upper bowl adapted to be mounted onto a filter-mounting base of an engine, in which a top end of the upper bowl is formed with oil inlets and an oil outlet, and a protruding structure is provided on an outer top end surface of the upper bowl and adapted to engage with the filter-mounting base so as to position the upper bowl and restrict rotation of the upper bowl relative to the filter-mounting base; and
   a lower bowl detachably coupled to the upper bowl, in which a bottom end of the lower bowl is closed, wherein the protruding structure is formed as a ring-shaped protrusion with axial recessed notches formed in a wall thereof.

2. The oil filter housing as set forth in claim 1, wherein the upper bowl and the lower bowl are threadedly coupled to each other.

3. The oil filter housing as set forth in claim 1, wherein the protruding structure is integrally formed with the upper bowl.

4. The oil filter housing as set forth in claim 1, wherein elastic locking hooks adapted to engage with a filter element are formed on an inner bottom surface of the lower bowl.

5. The oil filter housing as set forth in claim 1, wherein the upper bowl and the lower bowl are formed of non-metal material.

6. The oil filter housing as set forth in claim 5, wherein the upper bowl and the lower bowl are formed of modified nylon.

7. The oil filter housing as set forth in claim 1, wherein a plurality of the oil inlets are circumferentially formed in the top end surface of the upper bowl, the oil outlet is formed at the center of the top end surface of the upper bowl, and the protruding structure is located circumferentially between the oil outlet and the plurality of oil inlets.

8. The oil filter housing as set forth in claim 7, wherein the outer top end surface of the upper bowl is formed with a circumferential groove with a sealing pad received therein.

9. The oil filter housing as set forth in claim 8, wherein the top end surface of the upper bowl between the circumferential groove and the protruding structure is formed as an inwardly recessed arc-shaped surface.

* * * * *